United States Patent
Nagatomi et al.

(10) Patent No.: US 7,782,735 B2
(45) Date of Patent: Aug. 24, 2010

(54) OPTICAL PICKUP DEVICE CAPABLE OF HANDLING A PLURALITY OF LASER LIGHT BEAMS HAVING DIFFERENT WAVELENGTHS

(75) Inventors: Kenji Nagatomi, Gifu (JP); Seiji Kajiyama, Gifu (JP)

(73) Assignee: Sanyo Electric Co., Ltd., Osaka (JP)

( * ) Notice: Subject to any disclaimer, the term of this patent is extended or adjusted under 35 U.S.C. 154(b) by 1300 days.

(21) Appl. No.: 11/108,717

(22) Filed: Apr. 19, 2005

(65) Prior Publication Data
US 2005/0254391 A1    Nov. 17, 2005

(30) Foreign Application Priority Data
May 14, 2004    (JP)    ............... 2004-145169

(51) Int. Cl.
*G11B 7/135*    (2006.01)
(52) U.S. Cl. ............... 369/112.04; 369/44.37; 369/112.07
(58) Field of Classification Search ...............
369/112.03–112.07, 109.02, 112.1–112.12, 369/112.15–112.19
See application file for complete search history.

(56) References Cited

U.S. PATENT DOCUMENTS

| | | | |
|---|---|---|---|
| 5,493,554 A | | 2/1996 | Sasaki et al. |
| 6,259,561 B1 * | | 7/2001 | George et al. ............... 359/566 |
| 6,580,674 B1 * | | 6/2003 | Nishiyama et al. ...... 369/112.01 |
| 7,161,890 B2 * | | 1/2007 | Komma et al. .......... 369/112.07 |
| 7,215,609 B2 * | | 5/2007 | Shimano et al. .......... 369/44.37 |
| 7,218,598 B2 * | | 5/2007 | Kim et al. ............... 369/112.01 |
| 2002/0196726 A1 * | | 12/2002 | Takeda ................... 369/112.04 |
| 2003/0067686 A1 * | | 4/2003 | Shiono et al. ............... 359/566 |
| 2004/0125735 A1 * | | 7/2004 | Kyong et al. ........... 369/112.07 |
| 2004/0125737 A1 * | | 7/2004 | Iwata et al. .................. 369/121 |
| 2005/0226124 A1 * | | 10/2005 | Kimura et al. ......... 369/112.08 |

FOREIGN PATENT DOCUMENTS

JP    03-91125    4/1991

(Continued)

OTHER PUBLICATIONS

Machine-Assisted Translation of JP 2004-022717.*

(Continued)

*Primary Examiner*—Wayne R Young
*Assistant Examiner*—Nathan A Danielsen
(74) *Attorney, Agent, or Firm*—McDermott Will & Emery LLP (57) ABSTRACT

An optical pickup device that emits laser light beams having different wavelengths to a recording medium is disclosed. A semiconductor laser includes three laser elements having emitting wavelengths of $\lambda 1$, $\lambda 2$, and $\lambda 3$ ($\lambda 1 < \lambda 2 < \lambda 3$), respectively. A plurality of diffraction gratings substantially align optical axes of the laser light beams emitted from the laser elements with one another by diffracting action. The diffraction gratings are separately provided for corresponding laser light beams having wavelengths of $\lambda 2$ and $\lambda 3$. Diffracting action for aligning ±n-order diffraction light (n is an integer equal to or greater than 1) of each of the laser light beams having the wavelengths of $\lambda 2$ and $\lambda 3$ with an optical axis of a laser light beam having a wavelength of $\lambda 1$ is provided for the laser light beams having the wavelengths of $\lambda 2$ and $\lambda 3$.

3 Claims, 8 Drawing Sheets

FOREIGN PATENT DOCUMENTS

| | | |
|---|---|---|
| JP | 06-131688 | 5/1994 |
| JP | 10-261240 | 9/1998 |
| JP | 10-302297 | 11/1998 |
| JP | 11-134702 | 5/1999 |
| JP | 2895150 B | 5/1999 |
| JP | 2001-143297 | 5/2001 |
| JP | 2001-216677 | 8/2001 |
| JP | 2001-307369 | 11/2001 |
| JP | 2002-196123 | 7/2002 |
| JP | 2002-237081 | 8/2002 |
| JP | 2003-149443 | 5/2003 |
| JP | 2004-022717 | 1/2004 |

OTHER PUBLICATIONS

Chinese Office Action, with English Translation, issued in Corresponding Chinese Patent Application No. 200510068754.1, dated on Sep. 8, 2006.

Japanese Office Action, with English translation, issued in Japanese Patent Application No. JP 2004-145169 dated on Aug. 19, 2008.

Japanese Notification of Reasons for Refusal, w/ English translation thereof, issued in Japanese Patent Application No. JP 2004-145169 dated on Oct. 21, 2008.

* cited by examiner

OPTICAL PICKUP DEVICE CAPABLE OF HANDLING A PLURALITY OF LASER LIGHT BEAMS HAVING DIFFERENT WAVELENGTHS

BACKGROUND OF THE INVENTION

1. Field of the Invention

The present invention relates to an optical pickup device, and more particularly to an optical pickup device suitable for a compatible optical pickup device capable of emitting several kinds of laser light beams having different wavelengths to a recording medium.

2. Description of the Related Art

Currently, various optical discs such as a compact disc (CD) and a digital versatile disc (DVD) have been commercialized and widely used. Recently, next-generation DVD standardization for recording and reproducing information using a blue-violet laser light beam has been proceeded. In the next-generation DVD, information is recorded and reproduced using the blue-violet laser light beam having a wavelength of about 405 nm. When the wavelength of the laser light beam shortens, a higher density can be obtained.

Therefore, when the variety of optical discs increases, development of a so-called compatible optical pickup device capable of performing recording and reproduction on different kinds of optical discs is desired. In order to irradiate an optical disc with laser light beams having different wavelengths, it is possible to employ an arrangement in which semiconductor lasers that emit the laser light beams having the respective wavelengths are separately located. However, when such the arrangement is employed, spaces for locating the respective semiconductor lasers and optical elements for guiding the respective laser light beams to an objective lens are separately required, with the result that increases in outer size and the number of parts occur. Thus, an arrangement in which a plurality of laser elements having different emitting wavelengths are provided all together in a single CAN package has been studied. According to such the arrangement, a space for locating the semiconductor lasers can be reduced and an optical system can be commonly used among the respective laser beams.

However, when the plurality of laser elements are provided in the single CAN package as described above, a deviation occurs between the optical axes of the laser light beams according to arrangement gap between the respective laser elements. Therefore, when the optical axis of the optical system is aligned with the optical axis of a laser light beam, the optical axes of other laser light beams are deviated from the optical axis of the optical system. Thus, in the case of recording and reproduction using the other laser light beams, there arises a problem in that aberration of laser light beams is produced on an optical disc or a photo detector to cause deterioration of optical characteristics.

In order to solve such the problem, according to a conventional art described in JP 06-131688 A, a birefringence element is disposed immediately after a semiconductor laser including several kinds of laser elements, and the optical axes of the respective laser light beams are aligned with one another by the birefringence element to guide the laser light beams to the optical system. That is, the plurality of laser elements are disposed in the same CAN package such that the polarization plane of a reference laser light beam is orthogonal to the polarization plane of each of other laser light beams. The birefringence element that transmits the reference laser light beam and refracts the other laser light beams such that the optical axes thereof are aligned with the optical axis of the reference laser light beam is disposed immediately after the semiconductor laser. According to the structure described above, the laser light beams can be guided to the optical system located in the subsequent stage after the optical axes of the respective laser light beams are aligned with one another. Thus, the laser light beams having the respective wavelengths can be converged to a recording medium without aberration.

According to a technique described in JP 11-134702 A, a diffraction grating is disposed immediately before a photo detector that receives reflected light beams from an optical disc, thereby guiding reflected light beams having respective wavelengths to the photo detector. That is, three laser elements are disposed in the same CAN package. Laser light beams having different wavelengths which are emitted from the respective laser elements are converged onto the disc by the same optical system. Reflected light beams from the disc are diffracted by the diffraction grating and converged onto the photo detector. According to the structure described above, the respective laser light beams can be adequately converged to the photo detector. Therefore, it is possible to obtain a detection signal with no fluctuation.

The conventional art described in JP 06-131688 A requires an additional birefringence element. In addition, it is necessary to form the respective laser elements such that the polarization plane of the reference laser light beam is orthogonal to the polarization plane of each of the other laser light beams. However, it is hard to form the laser elements in which the polarization planes of the laser light beams are different from one another. When the additional birefringence element which is expensive is disposed, a problem in that a cost of the entire optical pickup device increases also occurs.

Refracting action of the birefringence element depends on the frequency. However, in view of the wavelengths of the laser light beams used for the compatible optical pickup device, a refraction angle when each of the laser light beams having the respective wavelengths is refracted by the birefringence element is not significantly changed. For example, a wavelength difference between a laser light beam for CD (780 nm in wavelength) and a laser light beam for DVD (655 nm in wavelength) is only about 100 nm. As a result, refraction angles of both the laser light beams which are produced by the birefringence element become substantially equal to each other.

Therefore, when the optical axis of the laser light beam for CD and the optical axis of the laser light beam for DVD are to be aligned with that of a laser light beam for next-generation DVD by the refracting action of the birefringence element, it is necessary to allow the laser light beam for CD and the laser light beam for DVD to enter the birefringence element with a state in which their optical axes are approximated to each other to such a degree that these axes are substantially aligned with each other. However, it is nearly impossible to dispose the laser elements with the state in which their optical axes are approximated to each other to the degree in manufacturing. Thus, it is very hard to align the optical axis of the laser light beam for CD (780 nm in wavelength) and the optical axis of the laser light beam for DVD (655 nm in wavelength) with that of the laser light beam for next-generation DVD by the birefringence element.

According to the conventional art described in JP 11-134702 A, the reflected light beams having the respective wavelengths are subjected to diffracting action by the diffraction grating disposed immediately before the photo detector, thereby guiding the respective light beams onto the photo detector. Therefore, when a variation in distance is caused between the optical axes of the reflected light beams having the respective wavelengths, the reflected light beams having the respective wavelengths cannot be adequately guided onto the photo detector unless a design of the diffraction grating is suitably modified according to the changed distance.

However, every time a variation in arrangement gap between the laser elements is caused due to a manufacturing error or the like, it is impractical to redesign the diffraction grating according to the arrangement gap. Therefore, in practice, there is no option but to use an existing diffraction grating without any modification in such a case, with the result that optical axis correction cannot be adequately performed. When a design value of an arrangement gap between laser elements is changed among makers, it is necessary to separately prepare respective diffraction gratings for the makers.

SUMMARY OF THE INVENTION

An object of the present invention is to provide an optical pickup device whose optical axis adjustment can be smoothly performed while an increase in cost is suppressed and whose optical axis correction can be accurately performed even in the case where a variation in arrangement gap between laser elements is caused.

The present invention is characterized by an optical pickup device that emits laser light beams having different wavelengths to a recording medium, including: a semiconductor laser including at least three laser elements having different emitting wavelengths, which are housed in the same case; and a plurality of diffraction gratings that substantially align optical axes of the laser light beams emitted from the laser elements with one another by diffracting action, in which the diffraction gratings are separately provided for corresponding laser light beams to be subjected to optical axis adjustments and each of the diffraction gratings has a grating pattern adjusted such that diffraction efficiency of a laser light beam to be subjected to optical axis adjustment by the diffraction grating and diffraction efficiencies of laser light beams having wavelengths different from that of the laser light beam subjected to optical axis adjustment by the diffraction grating are within an adequate range.

In the optical pickup device according to the present invention, the grating pattern of each of the diffraction gratings has a step height adjusted such that the diffraction efficiency of the laser light beam to be subjected to the optical axis adjustment by the diffraction grating and the diffraction efficiencies of the laser light beams having the wavelengths different from that of the laser light beam subjected to the optical axis adjustment by the diffraction grating are within the adequate range.

Also, in the optical pickup device according to the present invention, the semiconductor laser includes three laser elements having emitting wavelengths of $\lambda 1$, $\lambda 2$, and $\lambda 3$ ($\lambda 1 < \lambda 2 < \lambda 3$), which are housed in the same case such that two laser elements are arranged to sandwich a laser element having a shortest emitting wavelength, the diffraction gratings are separately provided for corresponding laser light beams having wavelengths of $\lambda 2$ and $\lambda 3$, and diffracting action for aligning ±n-order diffraction light (n is an integer equal to or larger than 1) of each of the laser light beams having the wavelengths of $\lambda 2$ and $\lambda 3$ with an optical axis of a laser light beam having a wavelength of $\lambda 1$ is provided for the laser light beams having the wavelengths of $\lambda 2$ and $\lambda 3$.

According to the present invention, when the optical pickup device emits a blue-violet laser light beam, a red laser light beam, and an infrared laser light beam, the laser element having the emitting wavelength of $\lambda 1$ is a laser element that emits the blue-violet laser light beam, and the laser elements having the emitting wavelengths of $\lambda 2$ and $\lambda 3$ are a laser element that emits the red laser light beam and a laser element that emits the infrared laser light beam, respectively.

Also, in the optical pickup device according to the present invention, each of two of the diffraction gratings which are separately provided corresponding to laser light beams having the wavelengths of $\lambda 2$ and $\lambda 3$ is located on one of a first optical path from the laser element to the recording medium and a second optical path which is an optical path from the recording medium to a photo detector and in which an optical path portion overlapped with the first optical path is removed.

According to the present invention, low cost diffraction gratings are used as the optical elements for optical axis adjustment, so that an increase in cost of the optical pickup device can be suppressed. In addition, the diffraction gratings are separately prepared for laser light beams to be subjected to the optical axis adjustment. Therefore, even when a variation in arrangement gap between the laser elements is caused, the position of a corresponding diffraction grating can be adjusted in an optical axis direction to align the optical axis of the laser light beam with a reference optical axis. Thus, according to the present invention, the optical axis adjustment of the laser light beam can be easily and smoothly performed while an increase in cost of the optical pickup device is suppressed.

As described above, each of the diffraction gratings can be designed by adjusting the step height of the grating pattern such that the diffraction efficiency of the laser light beam to be subjected to the optical axis adjustment by the diffraction grating and the diffraction efficiencies of the laser light beams having the wavelengths different from that of the laser light beam subjected to the optical axis adjustment by the diffraction grating are within the adequate range. This specific design method will become apparent from the description of the following embodiment.

When the two laser elements (wavelengths: $\lambda 2$ and $\lambda 3$) are arranged to sandwich the laser element (wavelength: $\lambda 1$) having the shortest emitting wavelength, a distance between light emitting points can be lengthened, so that an arrangement margin of the laser elements in the case can be increased. A relationship between a light emitting point gap and a wavelength will become apparent from the description of the following embodiment.

When the laser light beams having the wavelengths of $\lambda 1$, $\lambda 2$, and $\lambda 3$ are the blue-violet laser light beam, the red laser light beam, and the infrared laser light beam, respectively, it is possible to improve the diffraction efficiency of the blue-violet laser light beam. Therefore, the power of the blue-violet laser light beam whose emitting power is small at present can be prevented from being reduced by diffraction.

As described above, each of the diffraction gratings corresponding to the wavelengths of $\lambda 2$ and $\lambda 3$ can be located on one of a first optical path from the semiconductor laser to the recording medium and a second optical path which is an optical path from the recording medium to a photo detector and in which an optical path portion overlapped with the first optical path is removed.

When the diffraction grating is located on the first optical path, aberration of corresponding laser light beam is suppressed from being produced on the recording medium because the laser light beam is subjected to the optical axis adjustment before the recording medium is irradiated with it. At this time, a reflected light beam from the recording medium is also subjected to the optical axis adjustment. Therefore, aberration is also suppressed from being produced on the photo detector.

When the diffraction grating is located on the second optical path, aberration of corresponding laser light beam is suppressed from being produced on the photo detector because the laser light beam is subjected to the optical axis adjustment before it is incident on the photo detector. At this time, the laser light beam is not subjected to the optical axis adjustment before it is incident on the recording medium, so that aberration is produced on the recording medium. On the other hand, power of the laser light beam is prevented from being reduced by diffraction. Thus, high laser power can be maintained on the recording medium.

BRIEF DESCRIPTION OF THE DRAWINGS

The above-mentioned and other objects of the present invention and the novel features thereof will be completely more clear when the following description of the embodiment is read with reference to the accompanying drawings, in which.

DETAILED DESCRIPTION OF THE PREFERRED EMBODIMENT

Hereinafter, an embodiment of the present invention will be described with reference to the accompanying drawings. Note that the following embodiment is only an example and thus not intended to limit the scope of the present invention in any way.

Figure 1:
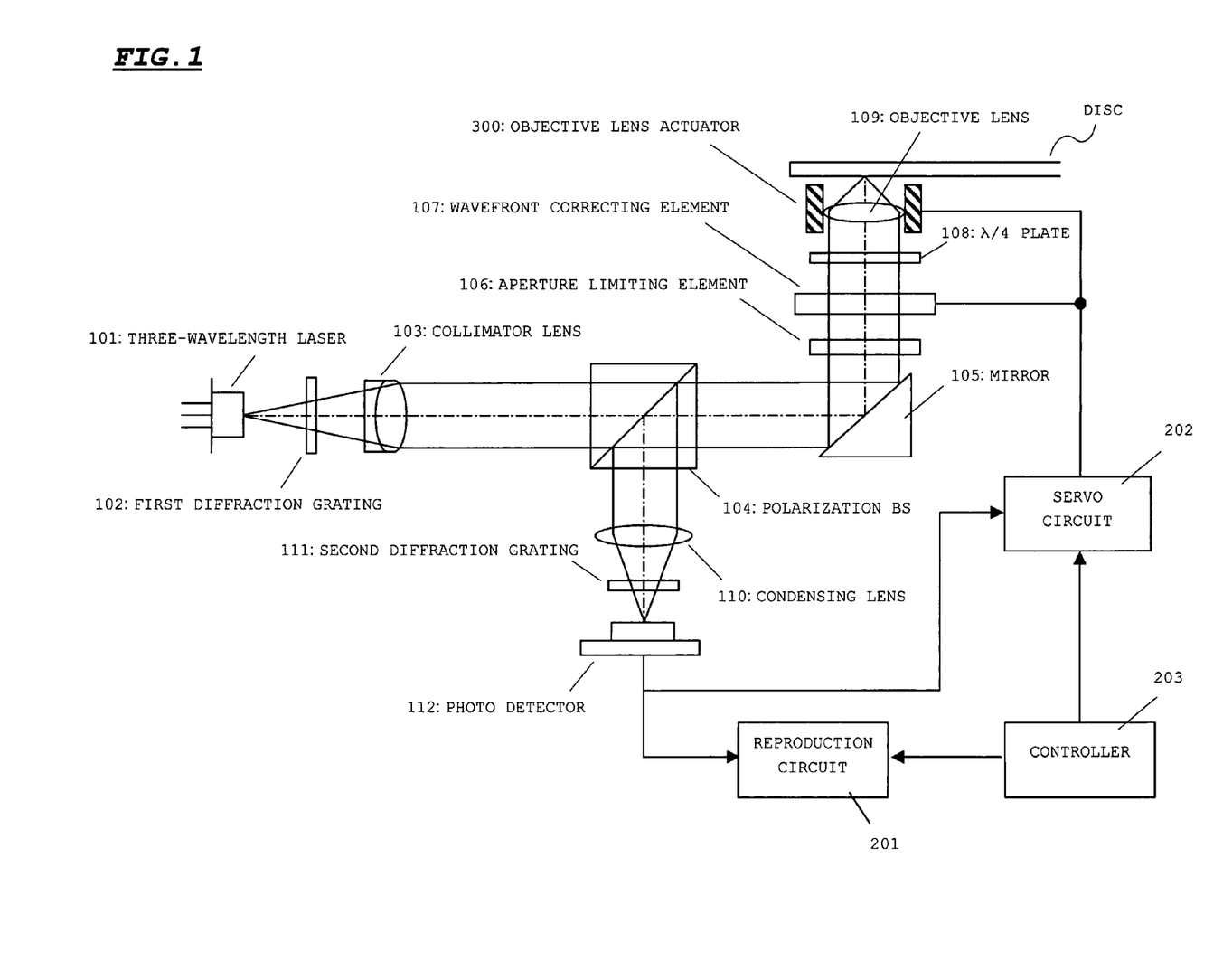
FIG. 1 shows a structure of an optical pickup device according to an embodiment of the present invention.

FIG. 1 shows a structure of an optical pickup device according to an embodiment of the present invention. The optical pickup device is used as a compatible device for CD/DVD/next-generation-DVD. In FIG. 1, a reproduction circuit 201, a servo circuit 202, and a controller 203 are components on the side of an optical disc apparatus.

As shown in FIG. 1, the optical pickup device includes a three-wavelength laser 101, a first diffraction grating 102, a collimator lens 103, a polarization BS (beam splitter) 104, a mirror 105, an aperture limiting element 106, a wavefront correcting element 107, λ/4 plate 108, an objective lens 109, a condensing lens 110, a second diffraction grating 111, a photo detector 112, and an objective lens actuator 300.

The three-wavelength laser 101 has three laser elements that emit a laser light beam for CD (780 nm in wavelength), a laser light beam for DVD (655 nm in wavelength), and a laser light beam for next-generation DVD (408 nm in wavelength), respectively, which are housed in the same CAN package. The respective laser elements are arranged in a straight line at predetermined gaps. Polarization planes of the laser light beams emitted from the respective laser elements are parallel to one another. The arrangement of the respective laser element will be described later.

The first diffraction grating 102 aligns the optical axis of the laser light beam for CD, of the laser light beams emitted from the three-wavelength laser 101 with the optical axis of the laser light beam for next-generation DVD thereof by the diffracting action. That is, a pattern designed to be capable of correcting a deviation in optical axis of the laser light beam for CD is formed in the first diffraction grating 102. A structure of the diffraction grating and optical axis deviation correcting action thereof will be described later.

The collimator lens 103 converts each of the incident laser light beams having the respective wavelengths from the first diffraction grating 102 into a parallel light beam. For example, the collimator lens 103 is formed by bonding a plurality of lenses whose Abbe numbers and curvatures (spherical surfaces) are adjusted such that an achromatic effect can be realized for each of the laser light beams having the respective wavelengths.

The polarization BS 104 is adjusted and disposed such that the polarization plane thereof is aligned with each of the polarization planes of the laser light beams emitted from the three-wavelength laser 101. Therefore, each of the laser light beams having the respective wavelengths which are converted into the parallel light beams by the collimator lens 103 substantially completely transmits through the polarization BS 104.

The mirror 105 changes each of the optical paths of the laser light beams from the polarization BS 104 upward in the objective lens 109 direction.

The aperture limiting element 106 cuts off the circumference of the laser light beam according to a substrate thickness of a disc. Therefore, the numerical aperture (NA) of each of the laser light beams incident on the objective lens 109 is adjusted. That is, the numerical aperture of the objective lens 109 is determined in advance for each of the laser light beams based on the substrate thickness of a disc. Thus, when the aperture limiting element 106 cuts off the circumferential portion of the laser light beam such that the numerical aperture corresponding to the substrate thickness of the disc is obtained, each of the laser light beams is allowed to enter the objective lens 109 at an appropriate, effective diameter.

For example, when the optical pickup device is a compatible device for CD/DVD/next-generation-DVD (0.6 mm in substrate thickness), only a substrate thickness of a CD (1.2 mm) is larger than those of the other discs. Therefore, only the NA of the laser light beam for CD is set to a value smaller than that of each of the other laser light beams based on the substrate thickness. The aperture limiting element 106 cuts off the circumferential portion of only the laser light beam for CD to adjust the effective diameter of the laser light beam for CD incident on the objective lens 109, thereby adjusting the numerical aperture of the laser light beam for CD to a set value.

For example, a diffraction grating can be used as the aperture limiting element 106. A wavelength selective diffraction pattern is formed in the diffraction grating at an incident position of the circumferential portion of the laser light beam. The circumferential portion of the laser light beam having the corresponding wavelength is diverged by the diffraction action of the pattern. For example, in the case of the compatible device for CD/DVD/next-generation-DVD (0.6 mm in substrate thickness), a diffraction pattern for diffracting only the laser light beam for CD (780 nm in wavelength) is formed at the incident position of the circumferential portion. As a result, the circumferential portion of the laser light beam for CD is diverged by the diffraction to guide only the central portion thereof in the objective lens 109 direction.

Alternatively, a polarization filter can be used as the aperture limiting element 106. That is, the polarization filter is disposed at the position of the circumferential portion of a laser light beam which is to be subjected to aperture limitation, and the polarization plane of the laser light beam is made orthogonal to the polarization plane of the polarization filter. In this case, only the polarization plane of the laser light beam which is to be subjected to aperture limitation is made orthogonal to the polarization plane of the polarization filter. Thus, it is necessary to provide an additional member for rotating the polarization plane of the laser light beam relative to the polarization planes of the other laser light beams by 90°. For example, a wavelength selective λ/2 plate can be used as such a member.

A phase filter can be also used as the aperture limiting element 106. In this case, it is necessary to adjust a thickness of the phase filter to filter only the laser light beam which is to be subjected to aperture limitation.

The wavefront correcting element 107 corrects a wavefront state of a laser light beam in accordance with a servo signal from the servo circuit 202. As described above, each of the laser light beams having the respective wavelengths which are emitted from the three-wavelength laser 101 is converted into the parallel laser light beam by the collimator lens 103, so that the laser light beam after passing through the aperture limiting element 106 becomes a parallel laser light beam. In contrast to this, for example, when the objective lens 109 is designed so as to become a finite system for only a laser light beam having a predetermined wavelength, it is necessary to correct a wavefront state of the laser light beam having the predetermined wavelength based on the design. In such a case, the wavefront correcting element 107 provides wavefront correcting action to the laser light beam having the predetermined wavelength such that the wavefront state of the laser light beam having the predetermined wavelength becomes an adequate state.

More specifically, in case that the objective lens 109 is designed so as to become an infinite system for the laser light beam for DVD (655 nm in wavelength) and the laser light beam for next-generation DVD (408 nm in wavelength) and to become a finite system for the laser light beam for CD (780 nm in wavelength), only when the laser light beam for CD is used, the wavefront correcting element 107 is driven to correct the wavefront state of the laser light beam for CD to a wavefront state that fits to the specification of the objective lens 109.

For example, a liquid crystal element as described in JP 2895150 B can be used as the wavefront correcting element 107. That is, a plurality of concentric ring transparent electrodes are disposed to sandwich the liquid crystal element in an optical axis direction. The liquid crystal element is disposed such that the optical axis of a laser light beam passes through the center of each of the concentric ring transparent electrodes. Voltages are applied to the transparent electrodes to produce different refraction indexes of the liquid crystal element in a ring shape, thereby bending the wavefront state of the laser light beam. A refraction index at each position of the transparent electrode can be adjusted according to an amplitude of the applied voltage. Therefore, the wavefront state of the laser light beam can be adjusted to an adequate state by adjusting the applied voltage.

Alternatively, a birefringence element as described in JP 2003-149443 A can be used as the wavefront correcting element 107. A mechanical adjustment mechanism such as a beam expander or a lens inserting mechanism can be also used.

When the objective lens 109 is designed so as to become an infinite system for all the laser light beams, the wavefront correcting element 107 is unnecessary. In such a case, the wavefront correcting element 107 is omitted from the optical system shown in FIG. 1.

The λ/4 plate 108 converts each of the laser light beams that have completely transmitted through the polarization BS 104 (linearly polarized light beam) into a circularly polarized light beam. In addition, the λ/4 plate 108 converts a laser light beam reflected from the disc (circularly polarized light beam) into a linearly polarized light beam having a polarization direction orthogonal to that of a laser light beam incident thereon. Therefore, the laser light beam reflected from the disc is substantially completely reflected by the polarization BS 104.

The objective lens 109 is designed so as to adequately converge each of the laser light beams having the respective wavelengths on a recording layer. As described above, the objective lens 109 is designed so as to become an infinite system or a finite system for each of the laser light beams.

The objective lens actuator 300 drives the objective lens 109 in response to servo signals (tracking servo signal and focus servo signal) from the servo circuit 202. The description of the structure of the objective lens actuator 300 is omitted because it is known.

The condensing lens 110 condenses the laser light beam reflected by the polarization BS 104 (light beam reflected from the disc) onto the photo detector 112.

The second diffraction grating 111 aligns the optical axis of the laser light beam for DVD, of the laser light beams emitted from the three-wavelength laser 101 with the optical axis of the laser light beam for next-generation DVD thereof by the diffracting action. That is, a pattern designed to be capable of correcting a deviation in optical axis of the laser light beam for DVD is formed in the second diffraction grating 111. A structure of the diffraction grating and optical axis deviation correcting action thereof will be described later.

The photo detector 112 has sensor patterns for deriving a reproduction RF signal, a focus error signal, and a tracking error signal from an intensity distribution of received laser light beams. A signal from each of the sensor is outputted to the reproduction circuit 201 and the servo circuit 202, which are provide on the disc apparatus side.

The reproduction circuit 201 performs calculation processing on sensor signals received from the photo detector 112 to derive a reproduction RF signal and demodulates the derived reproduction RF signal to produce reproduction data.

The servo circuit 202 performs calculation processing on sensor signals received from the photo detector 112 to derive a tracking error signal and a focus error signal, produces a tracking servo signal and a focus servo signal based on the tracking error signal and the focus error signal, and outputs the tracking servo signal and the focus servo signal to the objective lens actuator 300. In addition, the servo circuit 202 outputs a drive signal to the wavefront correcting element 107 in response to an instruction from the controller 203.

The controller 203 controls the respective parts according to an input instruction or the like from a key input portion (not shown).

Figure 2A:
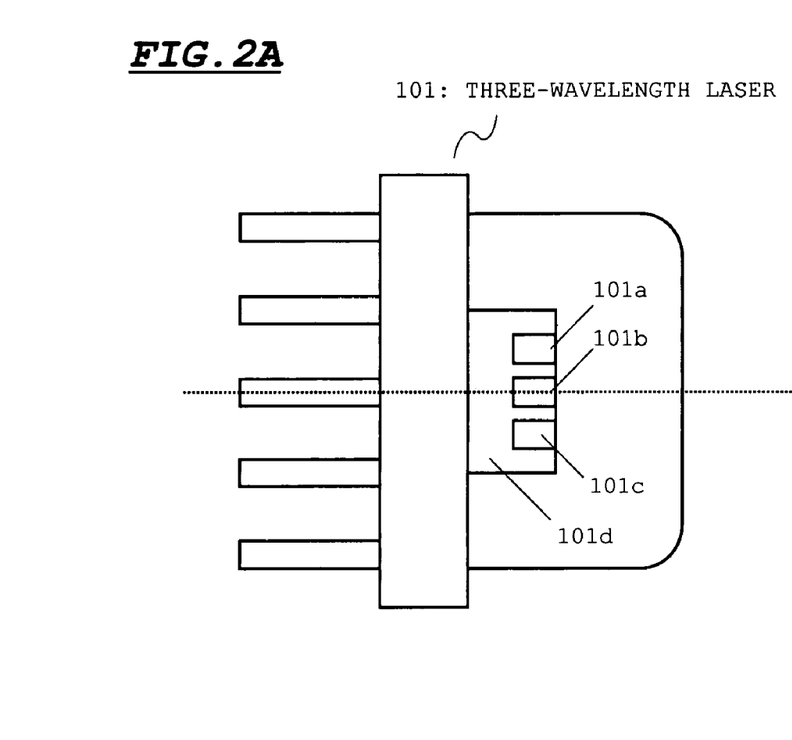
FIG. 2A shows a structure of a three-wavelength laser in the embodiment of the present invention and FIG. 2B shows the structure of the three-wavelength laser in the embodiment of the present invention.
Figure 2B:
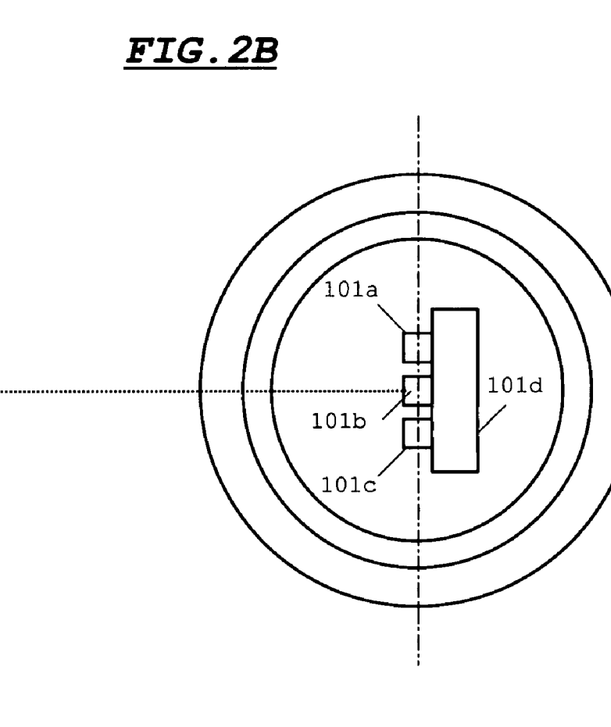

FIGS. 2A and 2B shows a structure of the three-wavelength laser 101. FIG. 2B is a right side view when FIG. 2A is viewed from the right side.

In FIGS. 2A and 2B, references 101a to 101c denote laser elements. As shown in FIGS. 2A and 2B, the laser elements 101a to 101c are mounted on a base 101d to be arranged in a straight line as viewed from the beam window side. An interval between the respective laser elements is such an interval that the laser light beams emitted from the laser elements 101a and 101c are diffracted by the first diffraction grating 102 and the second diffraction grating 111 such that the optical axes thereof are aligned with the optical axis of the laser light beam emitted from the laser element 101b.

Optical axis deviation correcting action made by a diffraction grating will be described with reference to FIG. 3.

Figure 3:
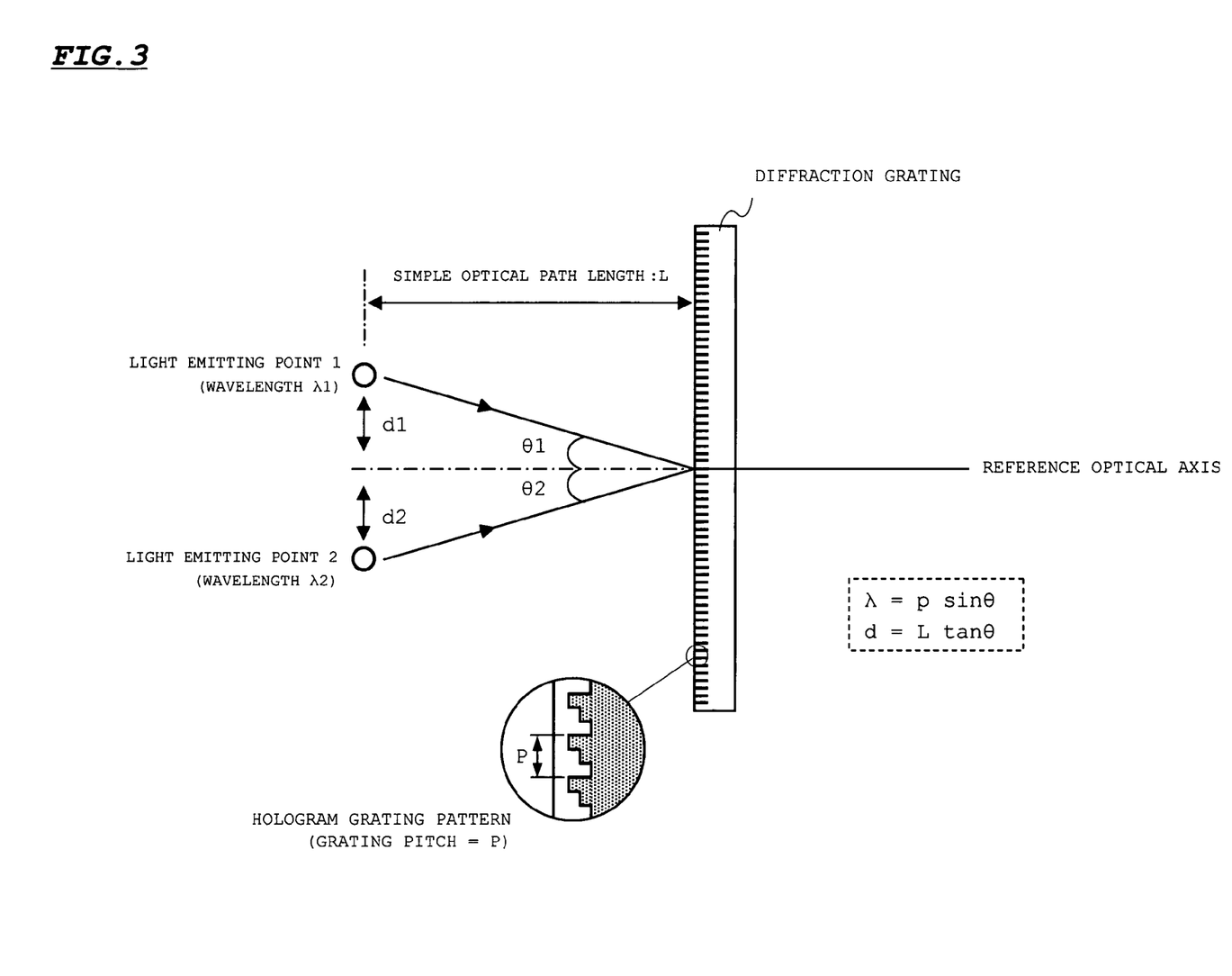
FIG. 3 is an explanatory view showing optical axis deviation correcting action made by a diffraction grating in the embodiment of the present invention.

When a hologram grating pattern as shown in FIG. 3 is formed on the surface on a laser light incident side of the diffraction grating, laser light beams emitted from light emitting points 1 and 2 are subjected to diffracting action by the grating pattern. FIG. 3 shows a grating pattern in which the number of steps is 3.

When a grating pitch is given by p, a relationship between a diffraction angle θ of first-order diffraction light of a laser light beam and a wavelength λ thereof is expressed by the following expressions:

$$\lambda = p \sin \theta \quad (1)$$

$$\theta = \sin^{-1} \lambda/p \quad (2)$$

Therefore, when each of the optical axes of the laser light beams from the light emitting points 1 and 2 are to be aligned with a reference optical axis by the diffracting action of the diffraction grating, light emitting point gaps d1 and d2 are expressed by the following expressions $$d1 = L \tan \theta 1 \quad (3)$$

$$d2 = L \tan \theta 2 \quad (4)$$

Thus, the light emitting point gaps d1 and d2 are set as follows besed on wavelengths λ1 and λ2 of the laser light beams from the light emitting points 1 and 2 and the grating pitch p of the diffraction grating:

$$d1 = L \tan(\sin^{-1} \lambda 1/p) \quad (5)$$

$$d2 = L \tan(\sin^{-1} \lambda 2/p) \quad (6)$$

As is apparent from the above expressions (5) and (6), when a simple optical path length L is the same, the light emitting point gaps d1 and d2 are proportional to the wavelengths λ1 and λ2 of the emitted laser light beams. Therefore, when the light emitting point gaps d1 and d2 are to be lengthened, the wavelengths of the laser light beams from the light emitting points 1 and 2 may be increased.

In this embodiment, the laser light beam for CD (780 nm in wavelength), the laser light beam for DVD (655 nm in wavelength), and the laser light beam for next-generation DVD (408 nm in wavelength) are emitted from the three-wavelength laser 101. Therefore, when the light emitting point gaps are to be lengthened, the laser light beam for CD (780 nm in wavelength) and the laser light beam for DVD (655 nm in wavelength), which have long wavelengths, may be diffracted to align the optical axes of those laser light beams with the optical axis of the laser light beam for next-generation DVD (408 nm in wavelength).

That is, a laser element for next-generation DVD (wavelength: 408 nm), which has a shortest emitting laser wavelength, is located as the central laser element 101b of the laser elements 101a to 101c (see FIGS. 2A and 2B) housed in the three-wavelength laser 101. Laser elements for CD and DVD (wavelengths: 655 nm and 780 nm) are located to sandwich the laser element for next-generation DVD. Thus, the respective gaps d1 and d2 between the laser elements can be lengthened, with the result that the laser elements 101a to 101c can be easily arranged.

When the optical axis correction using the diffraction grating is performed, power of a laser light beam to be subjected to optical axis alignment reduces in view of diffraction efficiency. Therefore, a laser light beam which is to be maintained at high power may be excluded from laser light beams subjected to optical axis alignment.

At present, emitting power of the laser element that emits the laser light beam for next-generation DVD (wavelength: 408 nm) is weaker than laser power of the laser light beam for CD (780 nm in wavelength) and laser power of the laser light beam for DVD (655 nm in wavelength) As described above, when the laser element for next-generation DVD (wavelength: 408 nm) is located in the center to prevent optical axis correction using diffraction, the power of the laser light beam for next-generation DVD which is originally weak can be maintained high.

Figure 4:
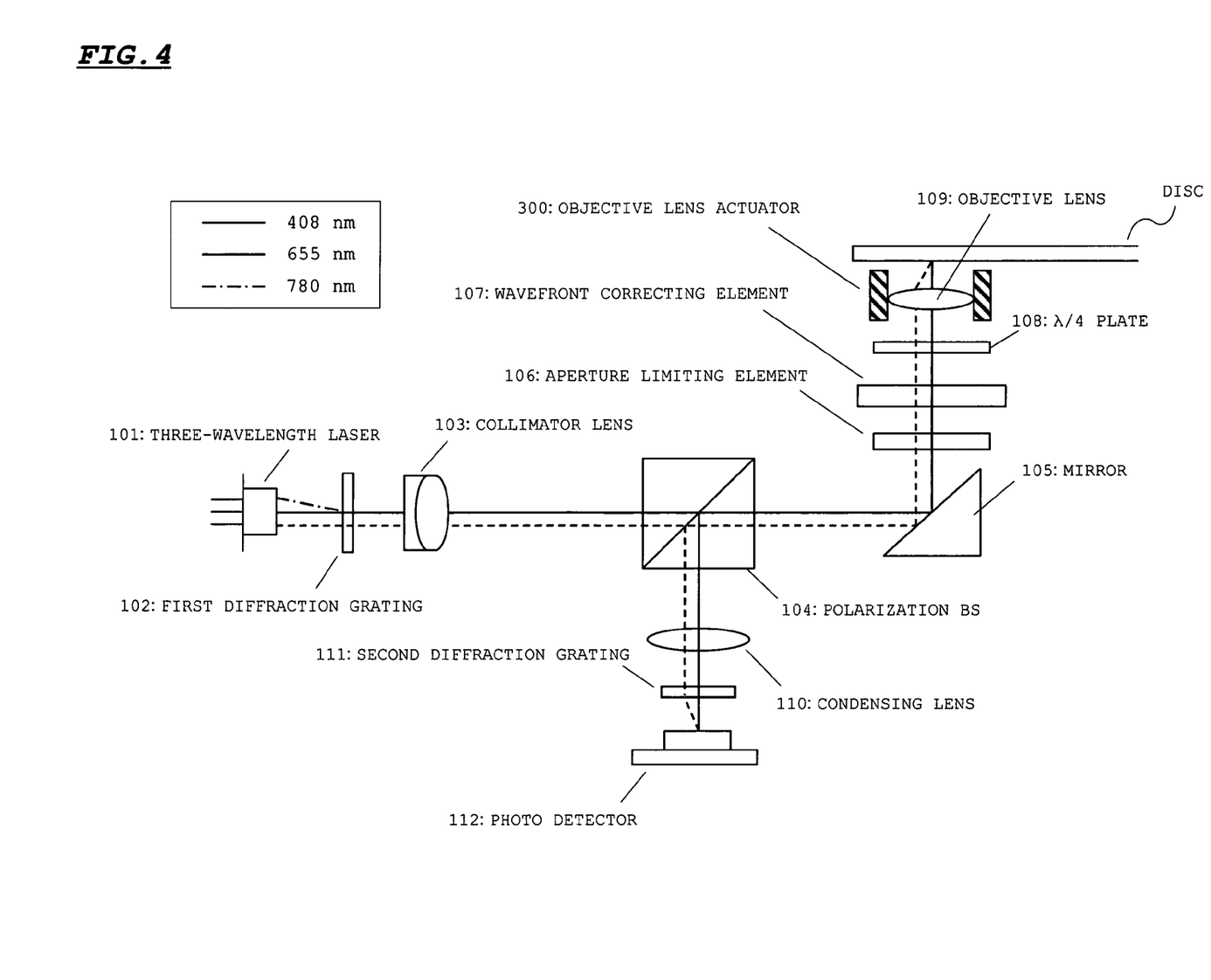
FIG. 4 is an explanatory diagram showing optical axis adjusting actions made by a first diffraction grating and a second diffraction grating in the embodiment of the present invention.

FIG. 4 shows a relationship between the three laser light beams emitted from the three-wavelength laser 101 and the optical axis adjusting actions made by the first diffraction grating 102 and the second diffraction grating 111.

As shown in FIG. 4, the optical axis of the laser light beam for CD (wavelength: 780 nm), of the three laser light beams emitted from the three-wavelength laser 101 is aligned with the optical axis of the laser light beam for next-generation DVD (wavelength: 408 nm) by the first diffraction grating 102. The laser light beam for DVD (wavelength: 655 nm) is not subjected to optical axis adjustment by the first diffraction grating 102 and thus is incident on the objective lens 109 with a state in which the optical axis thereof is deviated at the time of laser light beam emission.

The position of the objective lens 109 is adjusted with respect to the optical axis of the laser light beam for next-generation DVD, serving as the reference optical axis. Therefore, the laser light beam for CD and the laser light beam for next-generation DVD are converged onto the disc without aberration by the objective lens 109. In contrast to this, the laser light beam for DVD is incident on the objective lens 109 with a state in which the optical axis thereof is deviated, so that aberration is produced in the converged light beam on the disc.

In general, because aberration is inversely proportional to a wavelength of a laser light beam, aberration produced in the laser light beam for DVD does not become larger to the extent that recording/reproduction characteristics are severely affected thereby. Instead, when the laser light beam for DVD is used as a recording beam, it is preferable to put the maintenance of high laser power without the optical axis alignment using diffraction as in this embodiment before the optical axis alignment that causes reduction in laser power by diffraction. When laser power required for recording can be maintained, an additional diffraction grating for adjusting the optical axis of the laser light beam for DVD may be disposed in the front stage of the collimator lens 103.

Of the laser light beams reflected from the disc, the laser light beam for DVD is diffracted by the second diffraction grating 111 and the optical axis thereof is bent to guide the laser light beam for DVD onto the photo detector 112. The laser light beam for CD and the laser light beam for next-generation DVD are converged onto the photo detector 112 without the optical axis adjustment using the second diffraction grating 111.

A grating pattern (grating pitch: p) for aligning the optical axes of the laser light beams for CD and DVD with the optical axis of the laser light beam for next-generation DVD is set in each of the first diffraction grating 102 and the second diffraction grating 111 based on the above expressions (5) and (6). Therefore, when the light emitting point gaps d1 and d2 between the laser element for next-generation DVD and the laser element for CD and between the laser element for next-generation DVD and the laser element for DVD are deviated from the light emitting point gaps at the time of setting the grating pattern, the optical axis adjustment for the laser light beam for CD and the laser light beam for DVD cannot be adequately performed without any processing. In such a case, the first diffraction grating 102 and the second diffraction grating 111 are moved back and forth in the reference optical axis direction to adjust the simple optical path length L.

Figure 5A:
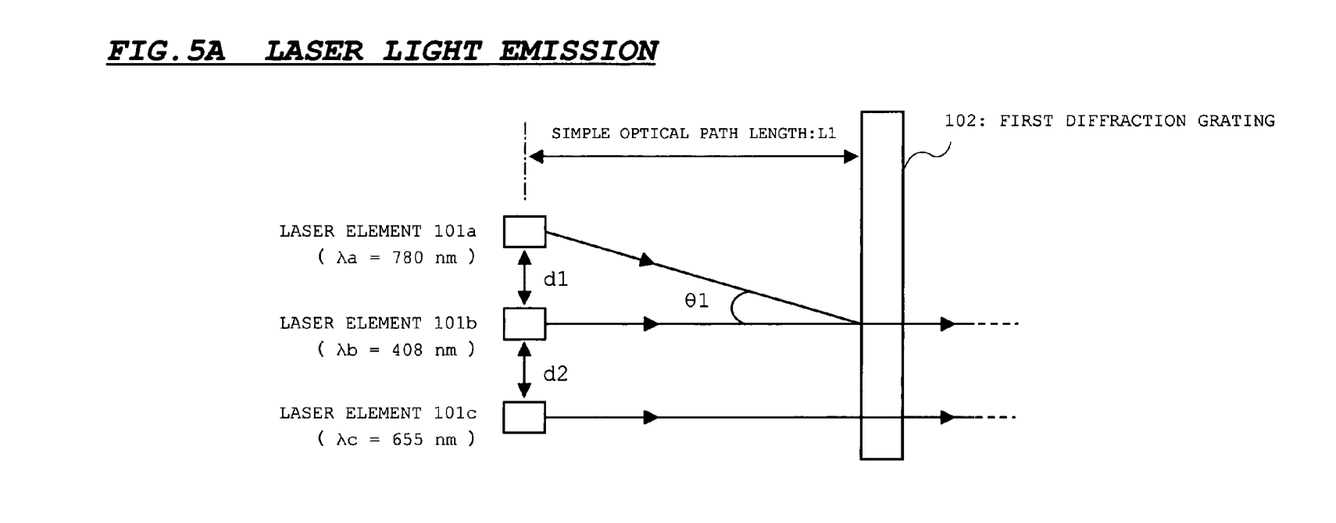
FIG. 5A is an explanatory diagram showing the optical axis adjusting action made by the first diffraction grating in the embodiment of the present invention and FIG. 5B is an explanatory diagram showing the optical axis adjusting action made by the second diffraction grating in the embodiment of the present invention.
Figure 5B:
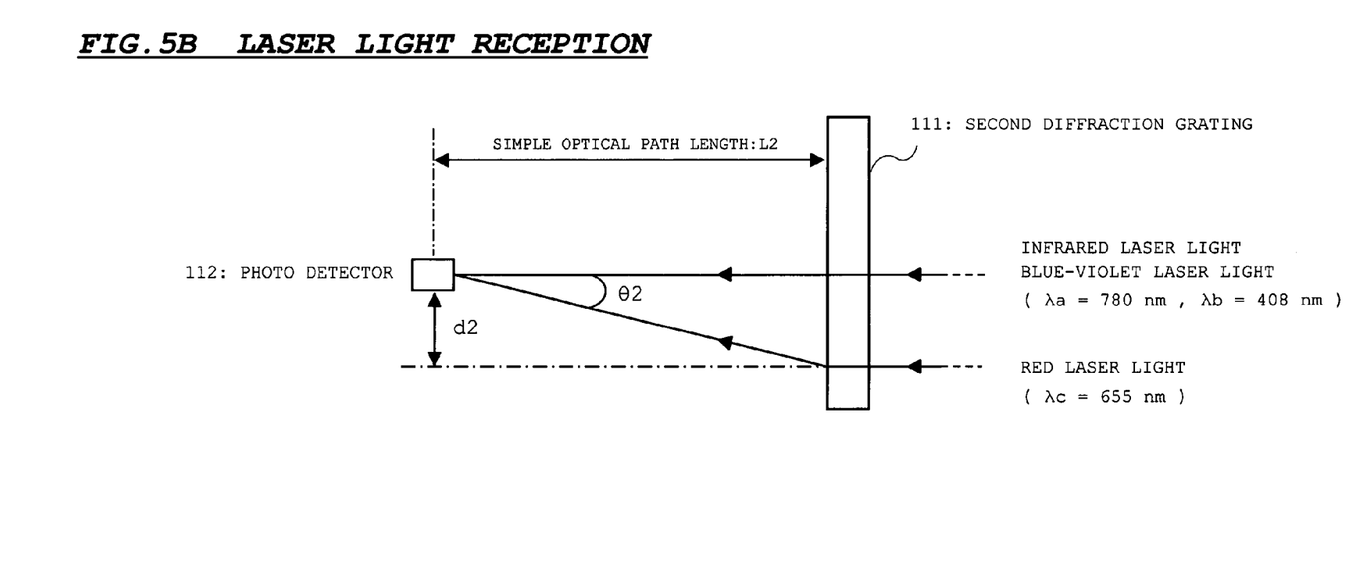

FIGS. 5A and 5B show the optical axis correcting actions made by the first diffraction grating 102 and the second diffraction grating 111.

When the light emitting point gap d1 related to the laser element 101a (for CD) becomes larger than a design gap value, the first diffraction grating 102 is moved to a position at which θ1 becomes a design angle value to keep it away from the three-wavelength laser 101. On the other hand, when the light emitting point gap d1 becomes smaller than the design gap value, the first diffraction grating 102 is moved to the position at which θ1 becomes the design angle value to bring it close to the three-wavelength laser 101.

Similarly, when the light emitting point gap d2 related to the laser element 101c (for DVD) becomes larger than a design gap value, the second diffraction grating 111 is moved to a position at which θ2 becomes a design angle value to keep it away from the photo detector 112. On the other hand, when the light emitting point gap d2 becomes smaller than the design gap value, the second diffraction grating 111 is moved to the position at which θ2 becomes the design angle value to bring it close to the photo detector 112.

In practice, the second diffraction grating 111 is being moved back and forth in the optical axis direction with a state in which a disc (DVD) is irradiated with the laser light beam emitted from the laser element for DVD, and an output from the photo detector 112 is monitored. Then, the second diffraction grating 111 is positioned at a position where the output from the photo detector 112 is best. After that, the first diffraction grating 102 is being moved back and forth in the optical axis direction with a state in which a disc (CD) is irradiated with the laser light beam emitted from the laser element for CD and an output from the photo detector 112 is monitored. Then, the first diffraction grating 102 is positioned at a position where the output from the photo detector 112 is best.

Figure 6:
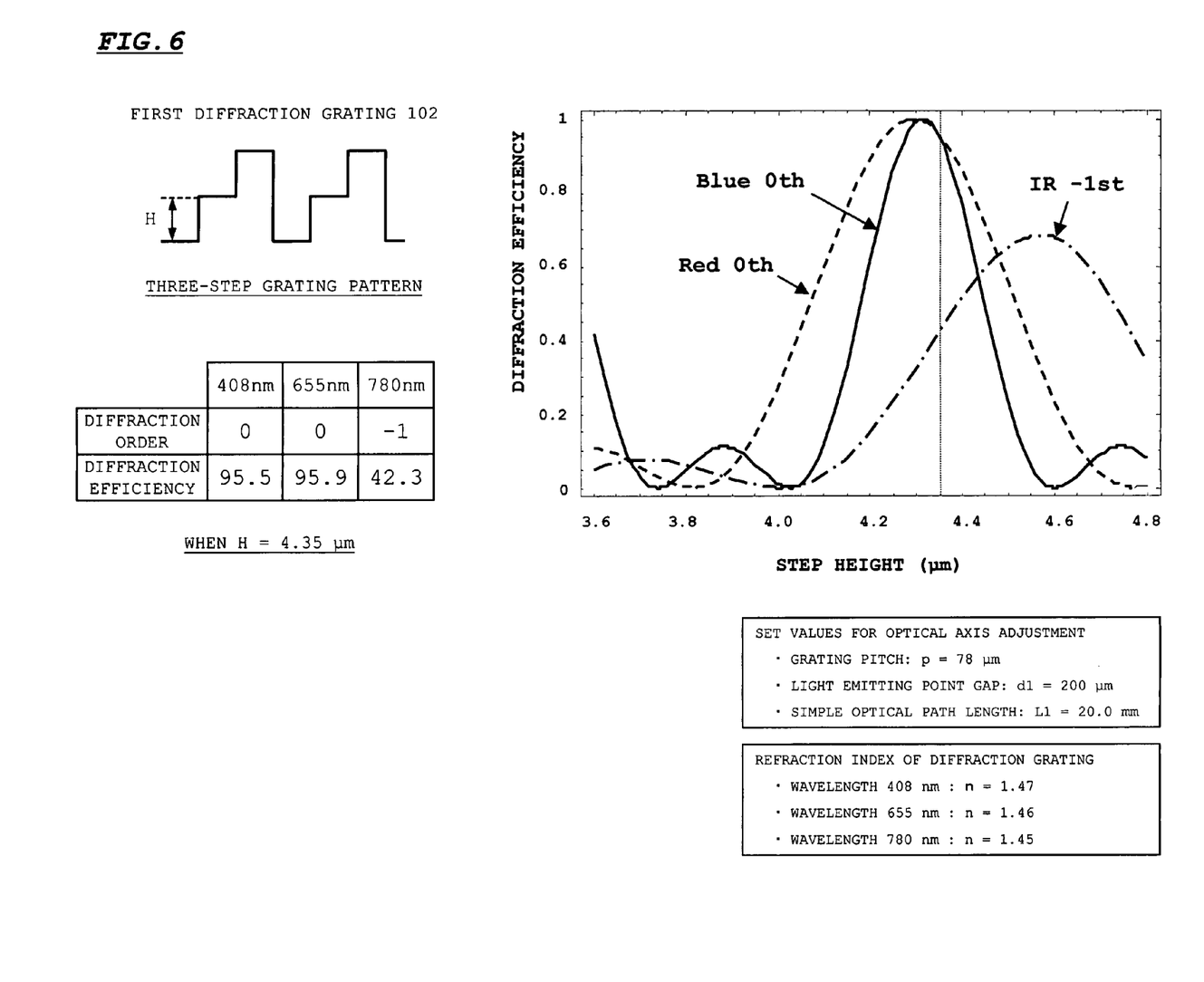
FIG. 6 shows a result obtained by simulation of diffraction efficiency of the first diffraction grating in the embodiment of the present invention.

FIG. 6 shows a relationship between the grating pattern of the first diffraction grating 102 and diffraction efficiency thereof.

FIG. 6 shows a result obtained by simulation in the case where the number of steps of the grating pattern is set to 3. A simulation condition is described in a margin below a characteristic graph showing the result obtained by simulation. In the graph, "Blue 0th", "Red 0th", and "IR-1st" show a diffraction efficiency characteristic of zero-order diffraction light of the laser light beam having the wavelength of 408 nm, a diffraction efficiency characteristic of zero-order diffraction light of the laser light beam having the wavelength of 655 nm, and a diffraction efficiency characteristic of negative first-order diffraction light of the laser light beam having the wavelength of 780 nm, respectively.

As is apparent from FIG. 6, when a step height H is set to about 4.35 μm in the case where the grating pattern has three steps, the diffraction efficiency of the laser light beam having the wavelength of 780 nm (for CD) can be improved to slightly over 40% while the diffraction efficiency of the blue-violet laser light beam having the wavelength of 408 nm (for next-generation DVD) and the diffraction efficiency of the red laser light beam having the wavelength of 655 nm (for DVD) is maintained at nearly 100%.

Figure 7:
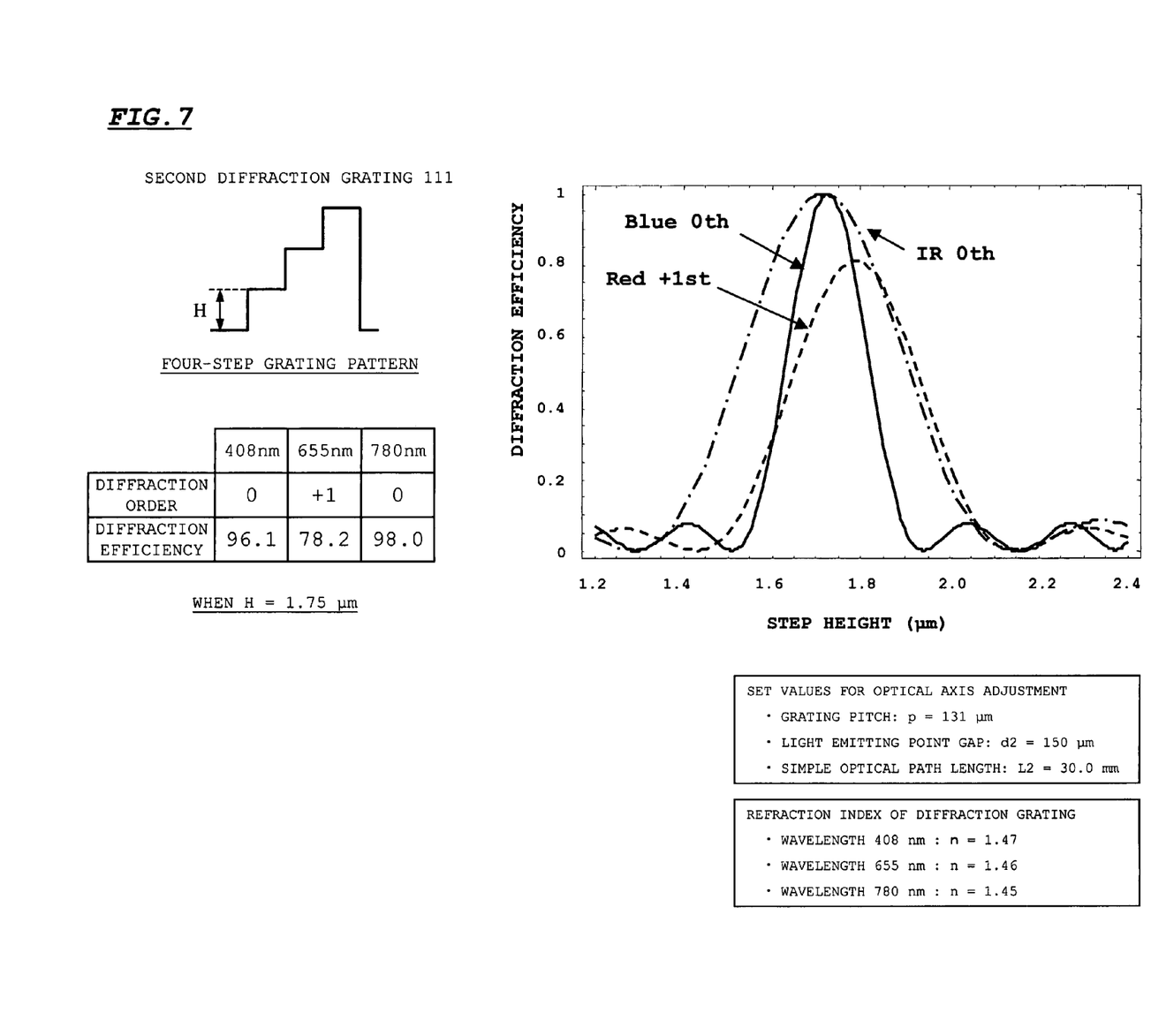
FIG. 7 shows a result obtained by simulation of diffraction efficiency of the second diffraction grating in the embodiment of the present invention.

FIG. 7 shows a relationship between the grating pattern of the second diffraction grating 111 and diffraction efficiency thereof.

FIG. 7 shows a result obtained by simulation in the case where the number of steps of the grating pattern is set to 4. A simulation condition is described in a margin below a characteristic graph showing the result obtained by simulation. In the graph, "Blue 0th", Red+1st, and "IR 0th" show a diffraction efficiency characteristic of zero-order diffraction light of the laser light beam having the wavelength of 408 nm, a diffraction efficiency characteristic of positive first-order diffraction light of the laser light beam having the wavelength of 655 nm, and a diffraction efficiency characteristic of zero-order diffraction light of the laser light beam having the wavelength of 780 nm, respectively.

As is apparent from FIG. 7, when the step height H is set to about 1.75 μm in the case where the grating pattern has four steps, the diffraction efficiency of the laser light beam having the wavelength of 655 nm (for DVD) can be improved to about 80% while the diffraction efficiency of the blue-violet laser light beam having the wavelength of 408 nm (for next-generation DVD) and the diffraction efficiency of the infrared laser light beam having the wavelength of 780 nm (for CD) is maintained at nearly 100%.

When the diffraction gratings shown in FIGS. 6 and 7 are used as the first diffraction grating 102 and the second diffraction grating 111, the diffraction efficiencies of the blue-violet laser light beam (for next-generation DVD), the red laser light beam (for DVD), and the infrared laser light beam (for CD) which have passed through the first diffraction grating 102 and the second diffraction grating 111 become 95.5%×96.1%=91.8%, 95.9%×78.2%=75.0%, and 42.3%×98.0%=41.5%, respectively. Therefore, even when the two diffraction gratings are used, the laser light beam having sufficient power can be converged onto the photo detector 112. In particular, the power of the blue-violet laser light beam (for next-generation DVD) is reduced by only less than 10%, with the result that high laser power can be maintained.

When a most preferable step height is set as the step height of the grating pattern, the simulations shown in FIGS. 6 and 7 are performed, diffraction efficiencies at the respective wavelengths are compared with one another based on results obtained by the simulations, and conditions that need to be satisfied by the laser light beams having the respective wavelengths are taken into account. For example, as described above, the emitting power of the blue-violet laser light beam is weaker than that of each of the other laser light beams at present. Therefore, first, the diffraction efficiency of the blue-violet laser light beam is set to 90% or more. Next, optimum step heights for the remaining two laser light beams are selected from a step height range satisfying that the diffraction efficiency of the blue-violet laser light beam is set to 90% or more. In this time, when it is unnecessary to set the power of the laser light beam for CD to very high power (for example, when an intended disc is a reproduction-only CD)

as described above, it is desirable to select a step height whereby the diffraction efficiency of the laser light beam for DVD becomes larger even if only slightly. When both powers for CD and DVD are to be increased, it is desirable to select a step height that both the powers become higher in a balanced manner.

As described above, according to this embodiment, low cost diffraction gratings are used as the optical elements for optical axis adjustment, so that an increase in cost of the optical pickup device can be suppressed. In addition, the first and second diffraction gratings 102 and 111 are separately disposed for laser light beams to be subjected to the optical axis adjustment. Therefore, even when a variation in arrangement gap between the laser elements is caused, the position of a corresponding diffraction grating can be adjusted in the reference optical axis direction to smoothly align the optical axis of the laser light beam with the reference optical axis. Thus, according to this embodiment, the optical axis adjustment of the laser light beam can be easily and smoothly performed while an increase in cost of the optical pickup device is suppressed.

The present invention is not limited to the above-mentioned embodiment and various other modifications can be made.

For example, in this embodiment, the laser element for the blue-violet laser light beam is located in the center. Another laser element may be located in the center. In such a case, as is apparent from the expressions (5) and (6), the light emitting point gaps become smaller than those in this embodiment and thus an arrangement margin for the laser elements is reduced. In addition, the diffraction efficiency (power) of the blue-violet laser (for next-generation DVD) is decreased.

In this embodiment, the first diffraction grating and the second diffraction grating have the three steps and the four steps, respectively. It is also possible to design each of the first and second diffraction gratings with the number of steps other than 3 or 4.

Figure 8:
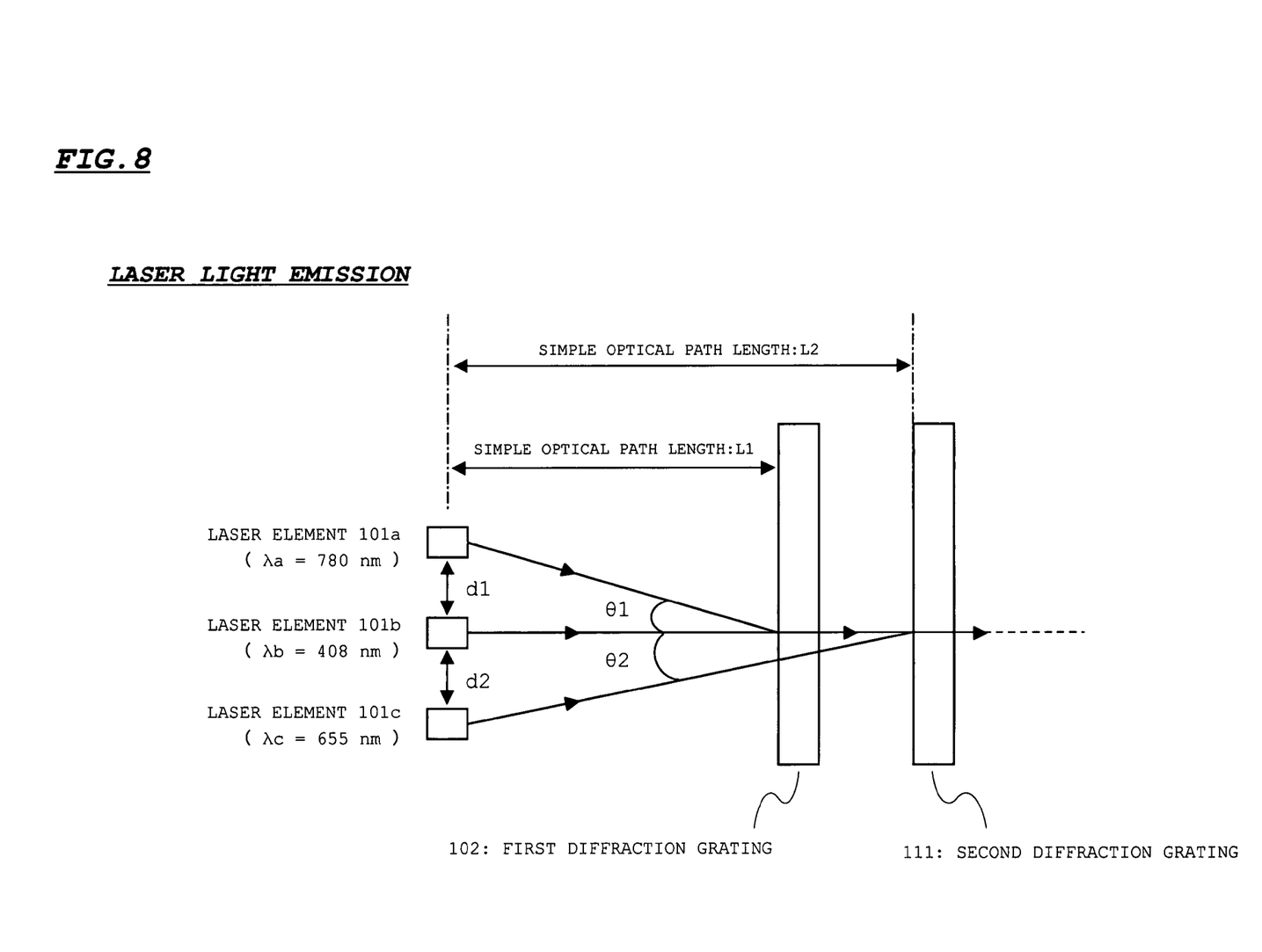
FIG. 8 is a diagram showing a modified example of the embodiment of the present invention.

In this embodiment, the first diffraction grating 102 is disposed immediately after the three-wavelength laser 101 and the second diffraction grating 111 is disposed immediately before the photo detector 112. As shown in FIG. 8, the second diffraction grating 111 may be disposed immediately after the three-wavelength laser 101. In this case, the laser light beam for DVD is subjected to the optical axis adjustment and then is incident on the objective lens 109. As a result, no aberration is produced in the laser light beam for DVD on the disc. Thus, as compared with the above case where the second diffraction grating 111 is disposed immediately before the photo detector 112, it is possible to improve an optical characteristic of the laser light beam for DVD on the disc.

Both the first diffraction grating 102 and the second diffraction grating 111 may be disposed immediately before the photo detector 112.

Various modifications of the embodiment of the present invention can be made as appropriate without departing from the scope of technical idea described in the claims.

What is claimed is:

1. An optical pickup device that emits laser light beams having different wavelengths to a recording medium, comprising:
    a semiconductor laser including three laser elements having emitting wavelengths of $\lambda 1$, $\lambda 2$, and $\lambda 3$, where $\lambda 1 < \lambda 2 < \lambda 3$, which are housed in the same case such that two laser elements are arranged to sandwich the laser element having the shortest emitting wavelength;
    a plurality of diffraction gratings that substantially align optical axes of the laser light beams emitted from the laser elements with one another by diffracting action;
    an objective lens through which the laser light beams emitted from the laser elements converges on the recording medium; and
    an optical detector that receives the laser light beams reflected from the recording medium,
    wherein the diffraction gratings include
        a first diffraction grating whose grating patterns have a step height adjusted such that the diffracting action for aligning ±n-order diffraction light, where n is an integer equal to or greater than 1, of the laser light beam having the wavelength of $\lambda 3$ with an optical axis of a laser light beam having a wavelength of $\lambda 1$ is provided for the laser light beam having the wavelength of $\lambda 3$, but the diffracting action is not provided for the laser light beams having the wavelength of $\lambda 1$ or $\lambda 2$, and
        a second diffraction grating whose grating patterns have a step height adjusted such that the diffracting action for aligning ±n-order diffraction light, where n is an integer equal to or greater than 1, of the laser light beam having the wavelength of $\lambda 2$ with the optical axis of the laser light beam having the wavelength of $\lambda 1$ is provided for the laser light beam having the wavelength of $\lambda 2$, but the diffracting action is not provided for the laser light beams having the wavelength of $\lambda 1$ or $\lambda 3$,
    the first diffraction grating is provided to align an optical axis of the laser light beam having the wavelength of $\lambda 3$ with the optical axis of the laser light beam having the wavelength of $\lambda 1$ before the laser light beam having the wavelength of $\lambda 3$ is incident on the objective lens, and
    the second diffraction grating is provided to align an optical axis of the laser light beam having the wavelength of $\lambda 2$ with the optical axis of the laser light beam having the wavelength of $\lambda 1$ after the laser light beam having the wavelength of $\lambda 2$ is incident on the objective lens but before the laser light beam having the wavelength of $\lambda 2$ reflected from the recording medium is incident on the optical detector.

2. An optical pickup device according to claim 1, wherein the laser element having the emitting wavelength of $\lambda 1$ comprises a laser element that emits a blue-violet laser light beam, the laser element having the emitting wavelength of $\lambda 2$ comprises a laser element that emits a red laser light beam, and the laser element having the emitting wavelength of $\lambda 3$ comprises a laser element that emits an infrared laser light beam.

3. An optical pickup device according to claim 1 or 2, wherein
    each of two of the diffraction gratings which are separately provided for corresponding laser light beams having the wavelengths of $\lambda 2$ and $\lambda 3$ is located on one of a first optical path from the laser element to the recording medium and a second optical path which is an optical path from the recording medium to a photo detector and in which an optical path portion overlapped with the first optical path is removed.

* * * * *